April 3, 1962   F. C. MELCHIOR   3,027,768
AUXILIARY INDICATING COUNTER

Filed June 3, 1959   2 Sheets-Sheet 1

INVENTOR.
FREDERICK C. MELCHIOR

BY

ATTORNEYS

April 3, 1962     F. C. MELCHIOR     3,027,768
AUXILIARY INDICATING COUNTER
Filed June 3, 1959     2 Sheets-Sheet 2
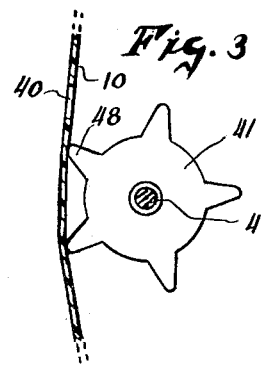
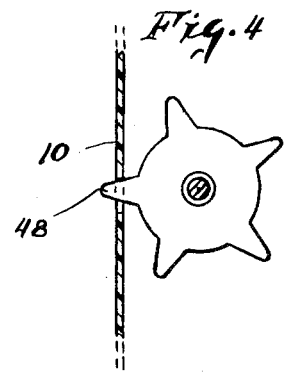
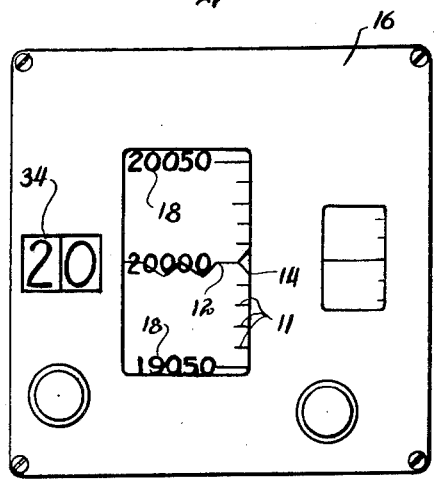
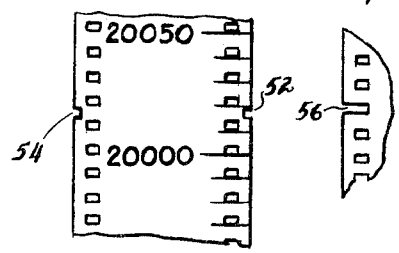
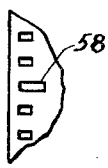
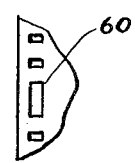
INVENTOR.
FREDERICK C. MELCHIOR
BY
Emery Whittemore Sandoe & Graham
ATTORNEYS United States Patent Office 3,027,768
Patented Apr. 3, 1962

3,027,768
AUXILIARY INDICATING COUNTER
Frederick C. Melchior, 258 Riverside Drive,
New York, N.Y.
Filed June 3, 1959, Ser. No. 817,879
5 Claims. (Cl. 73—384)

This invention relates to indicators, and more particularly, relates to an auxiliary indicator for use with a barometric altimeter having a moving tape with a non-linear scale imprinted thereon.

Indicators in which a scale is imprinted on a tape and the tape moved past an index position in accordance with sensor movement have many advantages.

For example, a barometric altimeter having pressure sensitive sensors such as aneroid diaphragm capsules, and a tape with a scale imprinted thereon which is moved past an index position by a servo system following the sensor movement has the advantage of unloading the sensor, provides a high degree of accuracy and allows precise following of aircraft altitude without indicator lag. Examples of such barometric altimeters are set forth in the article entitled, "New Altimeter May Ease Problem of High Altitude Traffic Control," published in the December 5, 1955, issue of Aviation Week by the McGraw-Hill Publishing Co., Inc., and the Institute of Aeronautical Sciences, report No. 59–84.

The tape used in such instruments may advantageously be calibrated during printing of the scale thereon to reflect variation in sensor reaction over the entire range of sensor measurement. For example, in barometric altimeters, the distance moved by the sensor for a fixed change in altitude will vary with the altitude. This non-linearity follows a logarithmic function which may be taken into account during imprinting of the scale on the tape so that the servo system can be a simple linear system. Also variations in sensor response due to mechanical variations over the instrument range may be compensated for by scale calibration.

In such instruments, the sensitivity thereof allows calibration of the scale to small units so that the indicator will precisely represent the sensor output indication. However, in some applications, the extended scale will result in rapid movement of the tape past the index position during rapid changes of sensor output. The tape movement may reach velocities at which the observer can no longer accurately read the indication presented.

For example, barometric altimeters of the type indicated may advantageously be employed in high performance aircraft due to the lack of lag of the indicator reading. However, during rapid changes in altitude of such high performance aircraft, the speed of the tape moving past the index position will reach velocities making it difficult for the pilot to quickly ascertain his altitude. Reduction of the velocity of scale movement by decreasing the sensitivity of the instrument would obviate the inherent advantages of such instruments.

It is, therefore, the object of this invention to provide an auxiliary indicator for use with a driven tape scale which will provide a digit indication of a tape reading in fixed multiples of the scale units.

It is a further object of this invention to provide an auxiliary indicator for use with a driven tape having a scale imprinted thereon which will present a numerical indication of the number of times that a predetermined multiple of the scale unit has passed an index position.

It is a further object of this invention to provide a barometric altimeter having a sensitive tape scale and an easily read coarse scale driven in accordance with movement of said sensitive scale.

In accordance with these objects I have provided in a preferred embodiment of this invention an auxiliary counter indicator for use with an instrument having a tape with a scale imprinted thereon which tape is driven past an index position in accordance with sensor measurement. An aperture is provided on said tape at positions separated by a predetermined plurality of scale units. A gear frictionally engaging the tape is positioned so that one tooth thereof will coact with the aperture as it passes the index position. A suitable transmission between the gear and the counter is provided to move the counter by one digit each time an aperture passes the index position. Thus, there is provided an auxiliary indicator, the reading of which will indicate the number of times that the predetermined plurality of scale units has passed the index position. This indication is maintained for ease of observation thereof during movement of the tape between limits defined by said plurality of units.

A preferred embodiment of this invention is illustrated in the accompanying drawings of which:

FIGURE 2 is a plan view of an instrument face showing the auxiliary indicator;

FIGURE 3 is a partially sectioned view of the tape and auxiliary indicator drive mechanism;

FIGURE 4 is a partially sectioned view of the apparatus shown in FIGURE 3 in operating position;

FIGURE 5 is a plan view of the tape in accordance with one form of this invention;

FIGURE 6 is a plan view of the tape with another embodiment of this invention;

FIGURE 7 is a partially sectioned view of the tape in accordance with a still further embodiment of this invention;

FIGURE 8 is a partially sectioned plan view of the tape in accordance with a still further embodiment of this invention.

Figure 1:
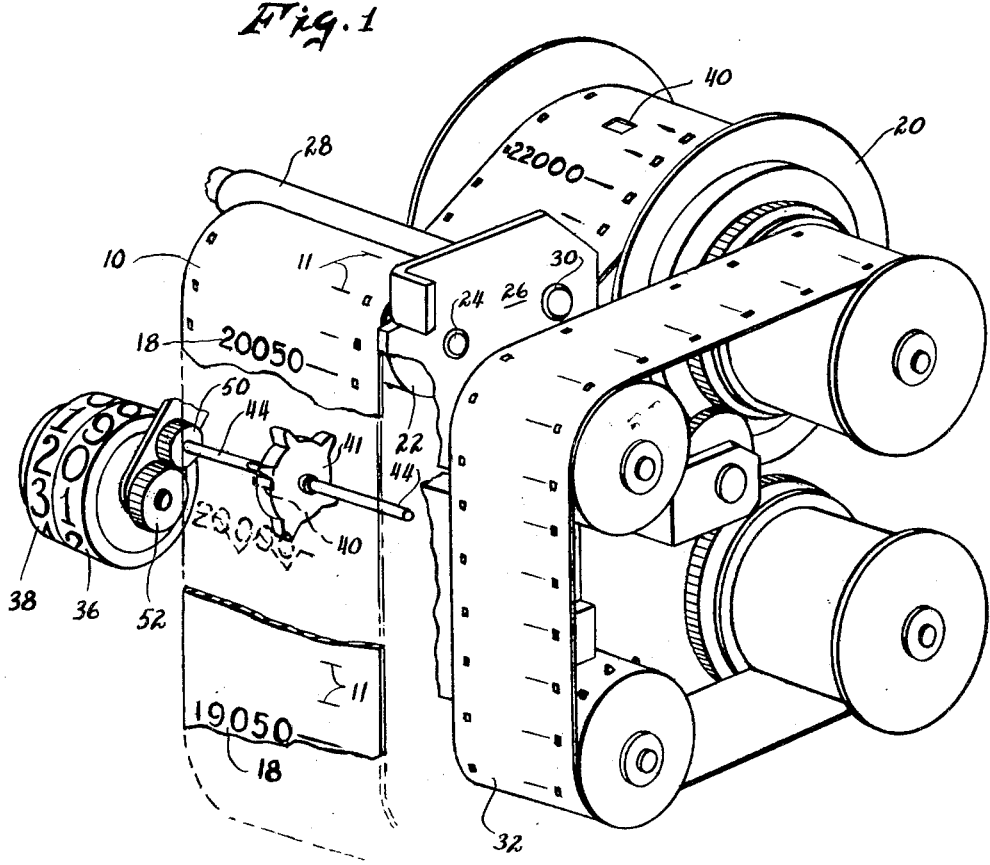
FIGURE 1 is a perspective view of a barometric indicator with the auxiliary indicator coupled thereto.

In FIGURES 1 and 2 there is shown a barometric altimeter employing a tape 10 having a scale 11 imprinted thereon which is driven passed an index position such as index line 12 extending across a viewing aperture 14 in the face 16 of the instrument case. The scale is marked at convenient intervals by numerical representation 18 on the scale.

The tape is pulled from a storage reel 20 by a sprocket drive 22 rotatably mounted in bearings 24 in the frame 26 of the altimeter. An idler roller 28 serves to maintain the tape orientation with respect to the sprocket. The reel 20 maintains tape tension at a constant predetermined value. The idler roller is mounted in bearings 30 in the altimeter frame 26. The sprocket 22 is driven by a servo system responsive to the sensor. For details of a suitable servo system responsive to the movement of aneroid capsules, reference is made to application, Serial Number 625,711, filed December 3, 1956, for Automatic Indicating and Control Instrument invention.

For adjustment of the zero position of the instrument such as for adjustment of the sea level reading during changes of ambient barometric pressure, there is provided a means for adjusting the position of the tape relative to the sensor position. A secondary tape indicates the amount of correction manually introduced. In a barometric altimeter the auxiliary tape 32 would indicate ambient barometric pressure.

The scale 11 is applied with the separation between unit indications determined by the sensitivity of the instrument. This scale is a non-linear scale applied as the instrument is calibrated. For example, in most instruments, such as a barometric altimeter, it is advantageous to design the servo system as a linear servo system. However, atmospheric pressure bears a logarithmic relationship to altitude. Thus, the relationship between a pressure sensitive sensor and altitude is non-linear. In a barometric altimeter the sensor movement for the same change in altitude will vary with the ambient altitude. Since barometric pressure can be represented as a logarithmic function of altitude, it is convenient to apply a corresponding non-linear scale to the tape to eliminate the necessity of correction curves and/or costly computer-type servo systems.

Since such altimeters follow changes in altitude with no appreciable lag in indication thereof, they are particularly suitable for application to high performance aircraft. However, during rapid changes in altitude, possible with high performance aircraft, observation of altitude on the tape scale is difficult. High performance aircraft may change altitude at the rate over 30,000 feet per minute. The corresponding tape velocity during such rapid changes in altitudes precludes easy observation of the indicated altitude. This is particularly so, since the pilot cannot be distracted from his duties of control of the aircraft for long periods of time trying to observe a moving indicator. Of course, the sensitivity of the instrument could be decreased to decrease the velocity of tape movement but such decrease would obviate the advantages of scale sensitivity required for proper aircraft separation at high altitudes.

To provide an easily observable indication of altitude, I have provided an auxiliary indicator viewable through aperture 34 in the face 16 of the instrument. This auxiliary indicator comprises a counter having a units drum 36 and a tens drum 38 with digits imprinted around the periphery thereof. This auxiliary counter will provide a numerical indication of a predetermined plurality of the scale units and will maintain this indication until a corresponding change has been made in altitude. For example, in a barometric altimeter the counter could count thousands of feet. Thus, the presentation would be in numerical form running from 1 to 99. The altitude indication provided by the auxiliary indicator would remain unchanged until the aircraft altitude had changed by the predetermined plurality of scale units, in this example, 1,000 feet.

In order to rotate the auxiliary indicator at each thousand feet interval an aperture 40 is provided in the tape 10 at positions separated by the desired plurality of scale units such as 1,000 feet in the example given. A gear 41 mounted on the shaft 44 is positioned with the teeth 48 thereof in frictional engagement with the tape and in position to coact with the aperture as the tape passes the index position. The action is best shown in FIGURES 3 and 4. In FIGURES 3 and 4 there is shown the gear 41 having the teeth 48 thereof in frictional engagement with the tape 10. The gear is preferably fabricated from material which will not introduce a large frictional drag upon the tape. I have found that a nylon gear is satisfactory for such purpose. As the aperture 40 approaches the index position, the tape tension will cause the tooth 48 to coact with the aperture and the coaction will cause rotation of the gear through an arc corresponding to the arc defined by two adjacent gear teeth. As soon as the aperture 40 has passed the index position, rotation of the gear will immediately stop as the adjacent tooth contacts the surface of the tape.

Rotation of the gear is transmitted to the counter through shaft 44, pinion 50 affixed thereto and gear 52 enmeshed with pinion 50.

The transmission comprising gears 50 and 52 must have a suitable gear ratio to rotate the counter by that amount necessary to change the indication thereof by one digit. With the five-tooth gear 50 passage of the aperture past the index position will cause a 72° rotation thereof. Since the units drum 36 of the counter must be rotated by 36 degrees to change the indication thereof by one digit, it will be apparent that the gear ratio between gears 50 and 52 must be 2 to 1.

Thus, the auxiliary counter will be rapidly rotated to change the indication thereof by one digit as the corresponding aperture passes the index position. Immediately thereafter rotation is stopped so that the pilot can easily observe the standing numerals quickly and without ambiguity. The tens drum 38 of the counter is suitably geared to the units drum 36 to change its indication by one digit for each revolution of the units drum 36.

The multiplying factor between the auxiliary counter and the scale unit will depend upon instrument sensitivity and anticipated aircraft maneuvering. In the example illustrated each 1,000 feet interval has been chosen as the predetermined plurality of the scale units to be indicated on the auxiliary indicator. With such a choice a two-digit counter will adequately cover the majority of anticipated flight altitudes.

It will be noted that by piercing apertures in the tape at positions separated by the desired scale distance (a multiple of the scale unit) that no correction need be made due to non-linearity of response. The tape calibration is thus utilized by auxiliary counter to present a correct indication of altitude. Similarly, correction of the zero position of the tape scale automatically corrects the zero position of the auxiliary indicator. The counter in the auxiliary indicator is reversible to both add and subtract to maintain a continuous accurate indication of the altitude in terms of 1,000 feet increments.

In some applications it is desirable to avoid piercing an aperture in the center of the tape. In such applications the embodiments shown in FIGURES 5–8 may advantageously be employed. In FIGURE 5 there is provided apertures 52 and 54 in the edges of the tape. These two gears on a single shaft may be employed to coact with the apertures for rotation of the auxiliary counter.

In FIGURE 6 there is provided an aperture 56 comprising a part of the perforation in the edge of the tape. The gear teeth to coact therewith must be wider than the tape perforations so that it will only coact with the desired aperture.

In FIGURE 7 there is shown an aperture 58 comprising a portion of the perforation in the edge of the tape. In manner similar to the embodiment shown in FIGURE 6 the tooth width of the drive gear for the auxiliary indicator must be wider than the perforations in the edges of the tape to prevent false indication.

In FIGURE 8 there is shown an aperture 60 comprising adjacent tape perforations. The drive gear coacting with such aperture must have a tooth with a blunted tip so that it will not coact with the normal perforations in the tape but will only coact with the longitudinally extending perforation 60.

It will be understood that the invention may be variously embodied and modified within the scope of the subjoined claims.

What is claimed is:

1. A barometric altimeter for high performance aircraft which comprises, in combination with a barometric altimeter having a non-linear scale calibrated in units of altitude imprinted on a continuous tape and means for moving said tape past an index position in response to movement of a barometric sensor, means on said tape to indicate each of said scale imprintations separated by a predetermined plurality of scale units, an auxiliary indicator comprising a counter having a digital scale thereon, and means for moving said counter by a single unit each time said indicating means on said tape passes said index position.

2. An altimeter in accordance with claim 1 in which said tape is provided with apertures in said tape at positions along said scale separated by said predetermined plurality of scale units, and said moving means comprises a gear positioned adjacent said tape, said gear having teeth adapted to coact with said apertures for rotation of said gear through an arc defined by the arc between adjacent teeth as said apertures pass the said index position.

3. An altimeter in accordance with claim 2 in which said counter comprises a units drum and a tens drum, and which includes a transmission between said units drum and said gear to rotate said units drum through an arc defined by the arc between adjacent digits as said gear is rotated by coaction with said aperture.

4. In combination with an altimeter having a non-linear scale imprinted on a tape moved past an index position, an auxiliary counter adapted to indicate predetermined multiples of the scale units and means to change the counter indication one unit each time one of said predetermined multiples of said scale units passes said index position.

5. A combination in accordance with claim 4 which includes means for rapidly rotating said counter through the arc corresponding to the arc between adjacent digits imprinted thereon as one of said predetermined multiples of said scale units passes said index position.

References Cited in the file of this patent
UNITED STATES PATENTS

| | | |
|---|---|---|
| 367,714 | Johnson | Aug. 2, 1887 |
| 2,208,728 | Menzer | July 23, 1940 |
| 2,656,721 | Melchior | Oct. 27, 1953 |
| 2,829,833 | Carbonara | Apr. 8, 1958 |